United States Patent Office 3,001,983
Patented Sept. 26, 1961

3,001,983
MONOAZO DYESTUFFS
Otto Schmid, Muttenz, near Basel, and Meinrad Hürbin, Basel, Switzerland, assignors to J. R. Geigy A.-G., Basel, Switzerland
No Drawing. Filed May 18, 1959, Ser. No. 813,680
Claims priority, application Switzerland June 2, 1958
6 Claims. (Cl. 260—196)

The invention concerns monoazo dyestuffs which are distinguished by a good drawing power onto wool from a neutral to weakly acid bath, by good fastness to light and by the good to very good wet fastness properties of the wool dyeings attained therewith. It also concerns a process for the production of these new dyestuffs as well as, as industrial product, the natural and synthetic polypeptide fibres fast-dyed with the aid of these dyestuffs.

It has been found that valuable monoazo dyestuffs are obtained if an aminodiphenyl ether, the benzene rings of which may be further substituted non-ionogenically, and which contains a tertiary sulphonic acid amide group in the o-position to the amino group, the nitrogen substituents of which acid amide group together contain at least 4 carbon atoms but the individual substituents consist of at most 7 carbon atoms, is diazotised and coupled in an acid medium with an aminonaphthalene compound coupling in o-position to the amino group, which aminonaphthalene compound contains a sulphonic acid group.

Chiefly positivising groups such as alkyl, alkoxy and acylamino groups are used as substituents which can be present in the benzene rings of the diazo components used according to the present invention. Thus for example, the benzene rings can be substituted by methyl, ethyl, isopropyl, tert. butyl, tert. amyl groups, methoxy, ethoxy or butoxy groups, acetylamino, benzolyamino, carbomethoxyamino, carbethoxyamino or carbobutoxyamino groups or also by triazinylamino groups. Also electron attracting, non-ionogenic groups can be present in the benzene ring containing no diazoium groups, for example carboxylic acid ad sulphonic acid amide groups derived from secondary organic amines, sulphonic acid aryl ester groups or alkyl or aryl sulphonyl groups. A substitution of the diazo components by halogen atoms such as chlorine or bromine or trifluoromethyl groups may have an advantageous effect on the properties of the dyestuffs produced therefrom.

The two substituents of the tertiary sulphonic acid amide group in the aminodiphenyl ethers used according to the present invention are chiefly saturated radicals. They are either acyclic or isocyclic or, with the amide nitrogen atom and possibly with the inclusion of further hetero atoms, they form a heterocyclic radical. Aminodiphenyl ether compounds having sulphonic acid dialkylamide groups, for example with sulphonic acid diethylamide, dipropylamide or dibutylamide groups produce dyestuffs which have a very good drawing power from a neutral or weakly acid bath. Particularly valuable dyestuffs are obtained with those diazo components in which at least one substituent of the sulphonic acid amide group is a cyclohexyl radical. Preferred dyestuffs are those having sulphonic acid dicyclohexylamide groups. Monoazo dyestuffs usable according to the present invention are also obtained, however, with those aminodiphenyl ether sulphonic acid amides in which only one substituent of the sulphonic acid amide group is a saturated radical and the other is a phenyl group such as, for example, one with sulphonic acid-N-ethyl or -N-cyclohexyl phenylamide groups.

The aminodiphenyl ether sulphonic acidamides used according to the present invention are produced for example in the following manner. p-Nitrohalogenbenzene is condensed with a phenolate, the nitro group in the condensation product is reduced to the amino group and this is then acylated, for example, with acetic acid anhydride. The acylaminodiphenyl ether is then nitrated in o-position to the acylamino group, the latter is saponified to the amino group, this is diazotised and exchanged for the sulphonic acid chloride group. The exchange is effected by treating the diazonium compound in the presence of excess hydrochloric acid and small amounts of cuprous chloride in, for example, acetic acid solution or suspension, with sulphur dioxide. The nitrodiphenyl ether sulphonic acid chloride is then condensed with a secondary amine usable according to the definition and the nitro group in the nitrodiphenyl ether sulphonic acid amide is reduced to the amino group.

The aminodiphenyl ether sulphonic acid amides used according to the present invention are diazotised by the usual methods, for example in concentrated sulphuric acid with sodium nitrite or with nitrosyl sulphuric acid. The diazo components can also be diazotised with concentrated aqueous solutions of alkali nitrite in acetic acid solution in the presence of the necessary amount of aqueous mineral acids.

The amino group in the aminonaphthalene compounds containing a sulphonic acid group which can be used as coupling components, can also be substituted. However, aminonaphthalene sulphonic acids with a primary amino group are preferred coupling components. They produce very fast to light dyestuffs. Aminonaphthalene sulphonic acids having a substituted amino group, for example substituted with N-alkyl, N-aralkyl, N-cycloalkyl or N-phenyl amino groups produce dyestuffs which are distinguished chiefly by their good drawing power and their good wet fastness properties and the shades of which are bathochromic, i.e. shifted from orange red to bluish red. The coupling components used according to the present invention may also be substituted at the naphthalene ring by halogen or alkoxy groups and, in a suitable position, also by hydroxyl groups. Chiefly 2-aminonaphthalene sulphonic acids coupling in the 1-position are used as coupling components. Valuable orange dyestuffs are obtained mainly with 2-aminonaphthalene-5-, -6- or -7-sulphonic acids and particularly valuable red dyestuffs are obtained with 2-amino-8-hydroxynaphthalene-6-sulphonic acid.

The coupling with the diazo components is performed in an acid medium. The aminonaphthalene sulphonic acids are used in the form of the aqueous solutions of their alkali metal salts and the coupling is performed advantageously in the presence of agents which buffer mineral acid such as, for example, sodium acetate.

In the form of their alkali metal salts, the new monoazo dyestuffs are orange, red to brown powders which dissolve well in hot water. They dye silk, wool and synthetic polypeptide fibres in pure orange, red to bluish red shades. The wool dyeings are fast to light, washing, milling and sea water.

A particularly valuable class of dyestuffs according to the invention corresponds to the following general formula

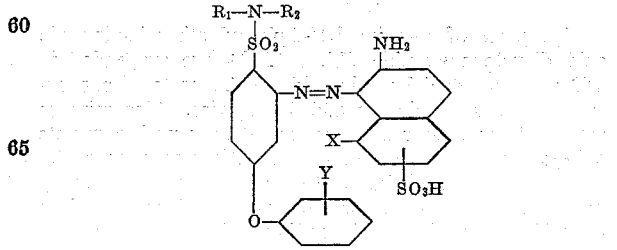

wherein
$R_1$ and $R_2$ each represent a member selected from the group consisting of phenyl, cyclohexyl and alkyl radicals of 2 to 4 carbon atoms and, both together with —N—, a piperidyl radical, X represents a member selected from the group consisting of H and OH, Y represents a member selected from the group consisting of H, halogen and alkyl.

Further details can be seen from the following examples. In the examples parts are given as parts by weight and their relationship to parts by volume is as that of grammes to cubic centimetres. The temperatures are in degrees centigrade. The examples illustrate the invention without limiting it in any way.

*Example 1*

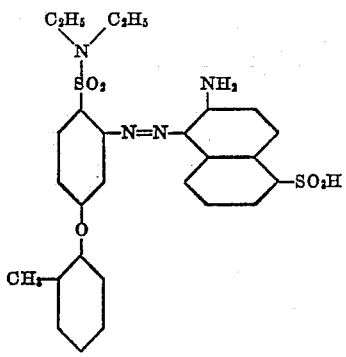

33.4 parts of 2'-methyl-3-amino-1.1'-diphenyl ether-4-sulphonic acid diethylamide (M.P. 118–120°) are dissolved with 19 parts of concentrated sulphuric acid in 160 parts of glacial acetic acid, and a solution of 6.9 parts of sodium nitrite in 16 parts of water is added dropwise at 5–10°. The clear diazo solution is poured at 0–5° into a solution of the sodium salt of 22.5 parts of 2-amino-naphthalene-5-sulphonic acid and 40 parts of crystallised sodium acetate in 600 parts of water. The mixture is stirred for several hours at 0–10°, 90 parts of sodium chloride are added, the dyestuff which precipitates is filtered off and dried.

It dyes wool from a neutral to weakly acid bath in pure orange shades which are fast to wet and light.

Dyestuffs having similar properties are obtained if in the above example 33.4 parts of 4'-methyl-3-amino-1.1'-diphenyl ether-4-sulphonic acid diethylamide (M.P. 153–155°) are used as diazo component.

*Example 2*

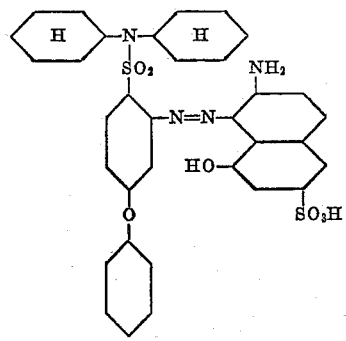

42.8 parts of 3-amino-1.1'-diphenyl ether-4-sulphonic acid dicyclohexylamide (M.P. 155°) are suspended in 150 parts of glacial acetic acid and 20 parts of concentrated sulphuric acid are added dropwise. The mixture is stirred for 1 hour at room temperature until complete solution is attained and then at 10–12° a solution of 6.9 parts of sodium nitrite in 15 parts of water is slowly poured in. This diazo solution is poured at 0–5° into an acidified solution of the sodium salt of 24 parts of 2-amino-8-hydroxynaphthalene-6-sulphonic acid in 600 parts of water. After 1 hour, the mineral acid is buffered by the addition of a solution of 28 parts of crystallised sodium acetate in 100 parts of water. The mixture is stirred for some hours, then heated to 60° and 30 parts of sodium chloride are sprinkled in. The dyestuff which precipitates is filtered off and dried. It dyes wool from a neutral to weakly acid bath in red shades which are fast to wet and light.

Dyestuffs having similar properties are obtained if in the above example 46.25 parts of 4'-chloro-3-amino-1.1'-diphenyl ether - 4 - sulphonic acid dicyclohexylamide (M.P.100–103°) or 44.2 parts of 4'-methyl-3-amino-1.1'-diphenyl ether-4-sulphonic acid dicyclohexylamide (M.P. 124°) or 34.6 parts of 4'-methyl-3-amino-1.1'-diphenyl ether-4-sulphonic acid piperidide (M.P. 205–206°) are used as diazo component.

*Example 3*

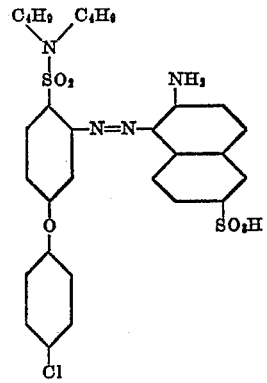

41.05 parts of 4'-chloro-3-amino-1.1'-diphenyl ether-4-sulphonic acid dibutylamide are dissolved with 19 parts of concentrated sulphuric acid in 120 parts of glacial acetic acid and a solution of 6.9 parts of sodium nitrite in 16 parts of water is added dropwise to this mixture at 10–12°. The diazo solution so produced is poured at 0–5° into a solution of the sodium salt of 22.5 parts of 2-aminonaphthalene-6-sulphonic acid and 30 parts of crystallised sodium acetate in 600 parts of water. The reaction mixture is stirred for several hours, then heated to 50° and 60 parts of sodium chloride are sprinkled in. The dyestuff which precipitates is filtered off and dried. It dyes wool from a neutral to weakly acid bath in fast orange shades.

Similar dyestuffs are obtained if in the above example 37.6 parts of 3-amino-1.1'-diphenyl ether-4-sulphonic acid dibutylamide or 39 parts of 4'-methyl-3-amino-1.1'-diphenyl ether-4-sulphonic acid dibutylamide are used as diazo component.

If 24 parts of 2-amino-8-hydroxynaphthalene-6-sulphonic acid are used as coupling component, then red dyestuffs which have good fastness to light are obtained.

*Example 4*

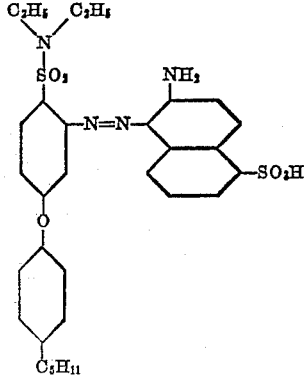

39 parts of 4'-tert. amyl-3-amino-1.1'-diphenyl ether-4-sulphonic acid diethylamide are dissolved in 160 parts of glacial acetic acid and 19 parts of concentrated sulphuric acid and the solution is diazotised at 10–12° by the dropwise addition of a solution of 6.9 g. of sodium nitrite in 20 parts of water. The diazo solution is poured at 0-3° into a solution of the sodium salt of 22.5 parts of 2-aminonaphthalene-5-sulphonic acid and 40 parts of crystallised sodium acetate in 600 parts of water. The mixture is stirred for several hours, heated to 60°, 30 parts of sodium chloride are added, the precipitated dyestuff is filtered off and dried.

It dyes wool from a neutral to weakly acid bath in pure orange shades which are fast to light and wet.

Example 5

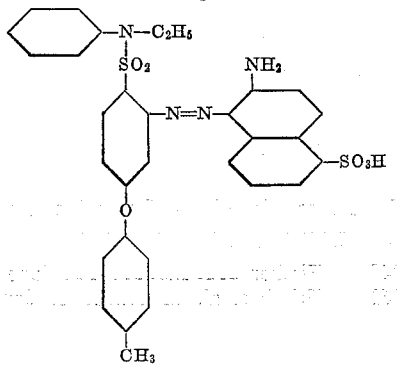

38.2 parts of 4'-methyl-3-amino-1.1'-diphenyl ether-4-sulphonic acid-N-ethyl anilide (M.P. 124°) are dissolved in 150 parts of glacial acetic acid and 19 parts of concentrated sulphuric acid and the solution is diazotised by the dropwise addition at 5–10° of a solution of 6.9 parts of sodium nitrite in 20 parts of water. The diazo solution so prepared is poured at 0–5° into a solution of the sodium salt of 22.5 parts of 2-aminonaphthalene-5-sulphonic acid and 40 parts of crystallised sodium acetate in 600 parts of water. The mixture is stirred for several hours, 60 parts of sodium chloride are added and the dyestuff which precipitates is filtered off and dried. It dyes wool from a neutral to weakly acid bath in pure orange shades which are fast to light and wet.

A red dyestuff with similar properties is obtained if 24 parts of 2-amino-8-hydroxynaphthalene-6-sulphonic acid are used instead of the 2-aminonaphthalene-5-sulphonic acid.

Example 6

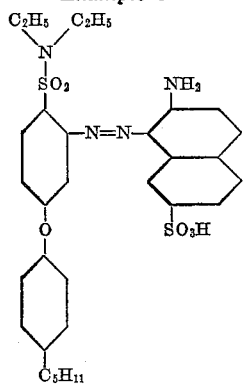

39 parts of 4'-tert. amyl-3-amino-1.1'-diphenyl ether-4-sulphonic acid diethylamide are dissolved in 160 parts of glacial acetic acid and 19 parts of concentrated sulphuric acid and diazotised at 10–12° by the dropwise addition of a solution of 6.9 parts of sodium nitrite in 20 parts of water. The diazo solution is poured at 0–3° into a solution of the sodium salt of 22.5 parts of 2-aminonaphthalene-7-sulphonic acid and 40 parts of crystallised sodium acetate in 600 parts of water. The whole is stirred for several hours, heated to 60° and 30 parts of sodium chloride are added. The dyestuff which precipitates is filtered off and dried. It dyes wool from a neutral to weakly acid bath in fast orange shades.

Similar dyestuffs are obtained if, in the above example, 33.4 parts of 2'-methyl-3-amino-1.1'-diphenyl ether-4-sulphonic acid diethylamide or 41.05 parts of 4'-chloro-3-amino-1.1'-diphenyl ether-4-sulphonic acid dibutylamide are used as diazo component.

What we claim is:

1. The monoazo dyestuff of the formula

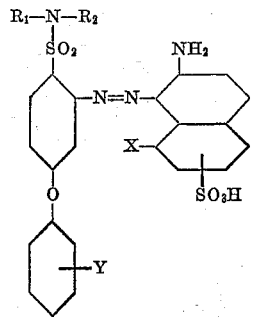

wherein $R_1$ and $R_2$ each represent a member selected from the group consisting of phenyl, cyclohexyl and alkyl radicals of 2 to 4 carbon atoms and, both together with —N—, a piperidyl radical, X represents a member selected from the group consisting of H and OH, Y represents a member selected from the group consisting of H, halogen and alkyl.

2. The monoazo dyestuff of the formula

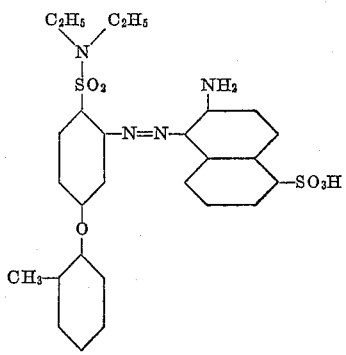

3. The monoazo dyestuff of the formula

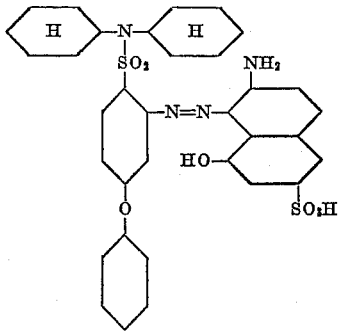

4. The monoazo dyestuff of the formula

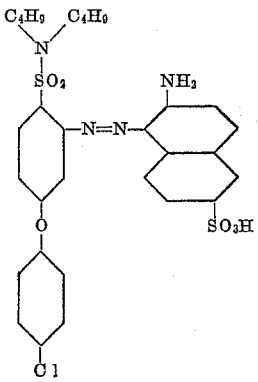

5. The monoazo dyestuff of the formula
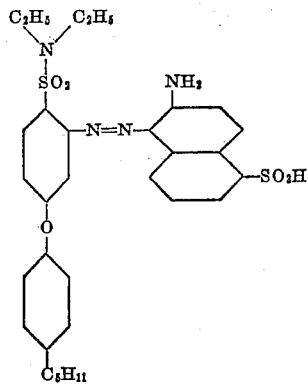
6. The monoazo dyestuff of the formula
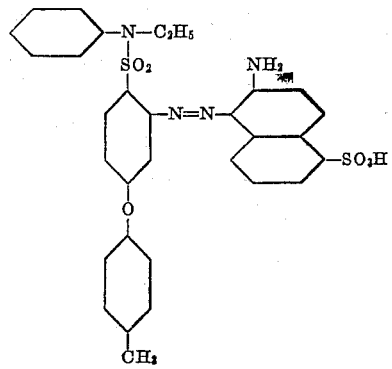
References Cited in the file of this patent
UNITED STATES PATENTS
2,205,848   Fischer _____ June 25, 1940
2,776,962   Frisch et al. _____ Jan. 8, 1957